Patented May 15, 1951

2,553,426

UNITED STATES PATENT OFFICE 2,553,426

METHOD FOR TERMINATING A LOW TEMPERATURE POLYMERIZATION PROCESS

Henry G. Schutze, Baytown, Tex., assignor, by mesne assignments, to Standard Oil Development Company, Elizabeth, N. J., a corporation of Delaware No Drawing. Application May 26, 1948, Serial No. 29,404

6 Claims. (Cl. 260—85.3)

This application is a continuation-in-part of U. S. Serial No. 726,232, filed February 3, 1947, and now abandoned.

The present invention is directed to an improved process for the polymerization of olefins in the presence of a Friedel-Crafts catalyst. More particularly, the invention is directed to the low temperature polymerization of olefinic mixtures in the presence of a catalyst of the aforementioned type.

In its more specific aspects, the invention is concerned with the recovery of high molecular weight polymer from reactors in which it is produced.

The production of high molecular weight polymer having the properties of synthetic rubber involves the polymerization of a tertiary monoolefin, such as isobutylene, with a diolefin, such as isoprene, or butadiene, at low temperatures of the order of −100° to −175° F. to obtain a product which has a small degree of unsaturation and susceptible to vulcanization. The polymerization is usually carried out at a low temperature in the aforementioned range in a diluent such as an alkyl halide, methyl chloride for example, with the reactant mass being well stirred and agitated throughout the course of polymerization. After the polymerization has reached a suitable point, the reactants are dumped into a body of a liquid such as hot water or alcohol to kill the reaction and to recover the synthetic rubber and unreacted hydrocarbons.

The aforementioned process has enjoyed commercial acceptance for a number of years but is still susceptible to many improvements. For example, after a period of operating time the synthetic rubber, a portion of which is quite tacky and adhesive, forms a film and deposits in lumps on the interior surfaces of the reactor and thus cuts down heat transfer and results in the reactor's being shut down for cleaning. When a reactor is shut down for cleaning, considerable amounts of valuable polymer remain in the contents of the reactor and ordinarily are lost by virtue of catalyst being present in activating quantities even though the flow of catalyst solution to the reactor may be stopped. Furthermore, when the contents of the reactor are displaced, this valuable polymer is discharged from the system which may result in a loss of from 1,000 to about 3,500 pounds of rubber. Also, by virtue of the fact that the catalyst is still actively polymerizing the unsaturated material, a product is produced which may be deficient in quality and which contaminates the material remaining in the diluent which is of good quality.

It is, therefore, the main object of the present invention to provide a process whereby the valuable rubbery constituents remaining in the reactor at the termination of a run are recovered.

Another object of the present invention is to provide a process for shutting down a reactor in which synthetic rubber is produced whereby the reaction is terminated at the proper point and the product remaining in the reactor is substantially recovered.

The objects of the invention are achieved by terminating the flow of catalyst to the reactor and killing the residual catalyst remaining in the reactant solution while maintaining the flow of hydrocarbon feed thereto to allow recovery of the product remaining in solution under substantially operating conditions.

In accordance with the present invention, when it is desirable to shut down a given reactor of a plurality of reactors, the catalyst solution flow to the reaction is terminated while allowing the flow of hydrocarbon thereto to be continued, while maintaining vigorous agitation of the contents of the reactor. A quantity of a reagent, such as isopropyl alcohol or other alcohols of the same homologous series, is added to the contents of the reactor which kills the activity of the catalyst. During all this time, the agitation of the reactor contents is continued and the flow of hydrocarbon thereto as is in conventional operation with temperature conditions being maintained at a temperature in the range mentioned above.

The present invention is based on the discovery that active catalyst is present in the reactor at all times during operation thereof. Hence, when a reactor run is terminated by cutting off the flow of catalyst to the reactor, the formation of high molecular weight polymer is not terminated by the lack of fresh catalyst. If no changes are made in the quantity of feed conducted to the reactor after catalyst addition thereto has been terminated, the reactor will continue to produce rubber for an additional 30 to 60 minutes. Since, in the operation of a commercial synthetic rubber polymerization plant, it is desirable to obtain maximum advantage of the recycle, refrigeration, and feed preparation units, maximum polymer recovery from the reactor is obtained by utilizing a one to two hour feed flushing period during which the normal feed rate is maintained on the reactor. In a system in which complete mixing is obtained and in which no additional polymer is made after the catalyst has been cut out of the reactor, one displacement of the reactor contents will flush approximately 66% of the polymer contained in the reactor slurry out of the reactor overflow. However, if reaction continues after catalyst addition has been terminated, one displacement of the reactor will flush out considerably less than the 66% of the polymer contained in the reactor plus the polymer produced during the displacement period.

Thus, in accordance with the present invention, it is desirable to kill the active catalyst in the reactor with isopropyl alcohol or some other catalyst inactivator which is reactive with Friedel-Crafts catalyst, exemplified by aluminum chloride which has found commercial usage. By reacting the residual aluminum chloride with isopropyl alcohol, all of the time allotted for the flushing out of the reactor contents is utilized in displacing the polymer from the reactor.

It has been known to quench reactions of olefins in the presence of Friedel-Crafts type catalyst at low temperatures by adding an alcohol to the reaction mass. The prior art processes, however, have been concerned with the production of synthetic resins and in preventing the reaction of less reactive olefins in the material at higher temperatures. It has also been known to discontinue the addition of catalyst to a reaction zone in which tertiary mono-olefins and di-olefins are polymerized to arrest the polymerization reaction. However, in the prior art processes discontinuance of the addition of catalyst does not necessarily stop the reaction since catalyst remains in the reaction body. Thus, it has been necessary to dump the reaction body into a body of water or water containing an alcohol and the like to destroy the activity of the catalyst. The prior art has also taught the destruction of catalyst by discharging a polymerization body including tertiary mono-olefins and diolefins into a body of naphtha containing a low molecular weight alcohol. Thus, the prior art has had no teaching or knowledge of the deleterious effects of allowing the catalyst to continue its polymerization activity in the presence of olefins in the reaction zone.

It has also been taught that a liquid mixture containing polymer in contact with a wall of a reaction zone may be prevented from adhering thereto by allowing the exposed wall surface to be flushed by the reaction mixture. The arts have also been taught to add solvents for polymerization products to the reactant hydrocarbon and have also been taught to flush the inner walls of a reaction zone with a solvent to prevent adherence of polymer thereto.

In contrast to the prior art processes, the present invention does not contemplate production of resins nor does it contemplate employment of temperatures in excess of $-100°$ F. Neither does the present invention concern itself with dumping the polymerization mass into a body of quenching fluid. Thus, the products producible when operating at a temperature lower than $-100°$ F. and the products producible above this temperature are quite different, one being of the resin type and the other being of rubbery type having elasticity and susceptibility to vulcanization. The present invention is concerned chiefly with stopping a polymerization reaction in a reaction zone and conditioning the body of material contained therein so that it may be properly recovered. In short, in contrast to prior art teachings, the present invention interposes a step prior to the usual quenching or killing step. For example, it has been taught to dump the contents of a polymerization reactor in which a tertiary mono-olefin and a diolefin are polymerized into a body of liquid to stop the polymerization reaction and to recover the unreacted materials. It is to be reiterated that my invention includes as a step in the aforementioned process intermediate steps in which the flow of reactant olefins is continued; the flow of catalytic solution is discontinued; and a catalyst deactivating material is added to the body of reactants in the reaction zone to cause the reaction to be stopped at a desirable point. Thus, the prior art has no teaching of the combination of steps proposed in the present invention.

In addition, since the high molecular weight polymer has a lower specific gravity than the liquid in which it is produced, in this instance methyl chloride and unreacted butylene or isoprene, it is possible to "cream" the reactor contents by stopping the agitator after one-half to one displacement of the reactor contents has been achieved. If such an operation were attempted when active catalyst were present in the reactor, the "creamed" polymer would float to the top of the reactor and might agglomerate to a hard dense mass which would plug the overflow from the reactor and prevent flushing of the contents thereof. However, after the catalyst has been killed by injection of isopropyl alcohol into the contents of the reactor, the "creamed" polymer will not agglomerate and may be flushed out of the reactor by the feed being continued to the reactor as described before.

By proceeding in accordance with the present invention, it is possible to recover more than 50% of the polymer in the reactor at the end of catalyst injection. Heretofore, most of this polymer has been lost whereas in accordance with the present invention, the amount of polymers lost may be reduced to 5% of that contained in the reactor slurry at the termination of the reactor run.

The type of reactor employed in the practice of the present invention should be one as described in U. S. Serial No. 665,618, filed April 27, 1946, now abandoned and U. S. Serial No. 534,366, May 5, 1944, now U. S. Patent 2,474,592, for Frederick A. Palmer in which the reactor is provided with suitable agitating means and means for refrigeration to compensate for heat released by the reaction. The reactor is also provided with an overflow device to remove the product as produced and to compensate for the feed being constantly injected thereto. A suitable means for injecting the isopropyl alcohol into the feed going into the reactor should also be provided. Usually a small pot connected to a port controlled by suitable valving arrangement on the feed line will be suitable.

The amount of alcohol or other deactivating agent will vary depending on the quantity of catalyst employed. A reactor feeding 5 pounds of aluminum chloride and 10,000 pounds of feed per hour will require about 1.0 gallon of isopropyl alcohol to kill the active catalyst remaining in the reactor. While isopropyl alcohol has been mentioned as the deactivating agent, other reagents such as tertiary butyl alcohol and the like may be used. The molar ratio of the inactivator to the quantity of catalyst, for example, aluminum chloride, contained in the reactor should be in the ratio of at least two moles of inactivator to one mole of aluminum chloride contained in the reactor.

The "creaming" of the reaction contents may be obtained by suitable agitation after one-fourth to one displacement of the reactor contents has been obtained after the catalyst has been killed. The flushing is then continued for one-fourth to two displacements of the reactor.

The temperature employed at which the polymerization, killing, and flushing of the reactor are conducted are in the aforementioned low temperature range given above but preferably are in the range between −120° to about −140° F. If the temperature is not maintained in this low temperature range, products of impaired quality might result.

In order to illustrate further the beneficial effects of the present invention, inspections are given in the following table of synthetic rubber recovered from a commercial reactor in which the catalyst contained therein was killed by injection of isopropyl alcohol at the end of the run. In these particular runs the feed mixture consisting of 26.3% by weight of isobutylene, 0.7% by weight isoprene, and 73% by weight of methyl chloride was polymerized at a temperature in the range between −120° and −140° F. by addition to the feed mixture of a catalytic solution of aluminum chloride in methyl chloride. The catalytic solution contained an amount of aluminum chloride between 0.2 and 0.3% by weight of the solution. The solution was added to the feed mixture at a rate of 1500 pounds of catalytic solution per hour while the feed mixture was added to the reaction zone at a rate of 10,000 pounds per hour.

olefins having 5 to 7 carbon atoms such as isopentylene, isohexylene, and isoheptylene may be substituted for the isobutylene but the latter is preferred. Similarly, butadiene and isoprene have been mentioned as the diolefin. It will be understood that other diolefins and especially the conjugated diolefins may be employed in the practice of my invention. Those diolefins having 5 to 7 carbon atoms as illustrated by pentadiene-1,3, hexadiene-1,3, and heptadiene-1,3 may be used in lieu of isoprene and butadiene-1,3. Isoprene, however, will be the preferred diolefin.

Methyl chloride has been mentioned as a diluent for the reaction and as a solvent for the catalyst. It will be understood that other diluents and other solvents may be used. For example, ethyl chloride, methyl bromide, carbon disulfide, carbon tetrachloride and the like may be used as diluents and solvents for the reaction.

Aluminum chloride has been employed in describing the invention as illustrative of the Friedel-Crafts catalyst. It will be understood that other Friedel-Crafts catalysts such as ferric chloride, titanium tetrachloride, zirconium chloride, and the like, may be employed in the practice of the present invention, but aluminum chloride will be preferred in view of its availability, cheapness, and the experience gained in handling it.

The feed mixture may contain an amount of diluent such as methyl chloride in the range from about 70 to 80% by weight, tertiary mono-olefin in the range between about 20 and 30% by weight,

*Table*

| Run No. | Date | Mooney Viscosity [1] | | Tensile,[1] 40′ p. s. i. | Elong.,[1] 40′, % | p. s. i., 400% Mod.[1] | | | Run Length, Cat. Hours |
|---|---|---|---|---|---|---|---|---|---|
| | | 1½′ | 8′ | | | 20′ | 40′ | 80′ | |
| 1 | 4-28-46 | 35 | 32 | 2,730 | 820 | 490 | 785 | 975 | 34.7 |
| 2 | 5-6-46 | 32 | 30 | 2,670 | 790 | 555 | 855 | 1,145 | 48.8 |
| 3 | 5-7-46 | 29 | 26 | 2,500 | 830 | 535 | 790 | 1,160 | 16.0 |
| 4 | 5-8-46 | 34 | 31 | 2,840 | 780 | 629 | 965 | 1,350 | 38.6 |
| 5 | 5-9-46 | 35.5 | 32 | 2,670 | 790 | 545 | 890 | 1,190 | 35.6 |
| 6 | 5-10-46 | 37 | 33 | 2,560 | 795 | 565 | 835 | 1,220 | 49.0 |
| 7 | 5-11-46 | 36.5 | 34.5 | 2,730 | 815 | 600 | 900 | 1,265 | 41.0 |
| 8 | 5-12-46 | 36.0 | 33.5 | 2,710 | 790 | 595 | 900 | 1,295 | 37.8 |
| 9 | 5-13-46 | 42.0 | 39.0 | 2,895 | 790 | 595 | 895 | 1,180 | 37.4 |
| 10 | 5-14-46 | 43.0 | 40.5 | 2,760 | 750 | 645 | 965 | 1,350 | 13.5 |
| 11 | 5-14-46 | 43.0 | 40.0 | 2,805 | 735 | 640 | 1,010 | 1,400 | 48.9 |
| 12 | 5-15-46 | 50.0 | 45.5 | 2,910 | 760 | 705 | 1,020 | 1,400 | 10.6 |
| 13 | 5-16-46 | 32.5 | 29.5 | 2,590 | 745 | 615 | 950 | 1,340 | 28.6 |
| 14 | 5-17-46 | 37 | 34 | 2,590 | 735 | 620 | 965 | 1,450 | 35.2 |
| 15 | 5-20-46 | 52 | 47 | 2,875 | 750 | 680 | 1,025 | 1,390 | 29.0 |
| 16 | 5-21-46 | 40 | 36 | 2,700 | 755 | 620 | 925 | 1,330 | 19.0 |
| 17 | 5-22-46 | 48.0 | 43.5 | 2,805 | 765 | 620 | 985 | 1,420 | 27.1 |
| 18 | 5-24-46 | 63.5 | 58.0 | 2,989 | 750 | 730 | 1,075 | 1,495 | 27.0 |
| 19 | 5-28-46 | 45 | 41 | 2,810 | 760 | 625 | 985 | 1,335 | 44.3 |
| 20 | 5-28-46 | 32 | 29 | 2,550 | 840 | 520 | 790 | 1,100 | 47.8 |
| 21 | 5-29-46 | 44.0 | 40.5 | 2,850 | 780 | 615 | 975 | 1,355 | 38.5 |
| 22 | 5-30-46 | 41.5 | 37 | 2,800 | 760 | 605 | 935 | 1,330 | 12.0 |
| 23 | 5-31-46 | 43 | 40.5 | 2,890 | 755 | 665 | 1,015 | 1,385 | 10.7 |
| 24 | 6-3-46 | 49 | 45 | 2,825 | 740 | 700 | 1,020 | 1,400 | 36.5 |
| 25 | 6-4-46 | 25 | 21 | 2,250 | 840 | 400 | 625 | 975 | 13.8 |
| 26 | 6-5-46 | 36 | 32 | 2,730 | 785 | 600 | 935 | 1,325 | 28.0 |
| 27 | 6-6-46 | 44 | 39 | 2,730 | 755 | 645 | 755 | 1,320 | 21.6 |
| 28 | 6-7-46 | 21 | 19 | 2,240 | 825 | 445 | 735 | 1,060 | 46.0 |

[1] All compounds and tests in accordance with Rubber Reserve Specification Procedure for GRI, January 1, 1946.

It will be apparent from the foregoing data that with but very few exceptions the quality of rubber recovered was sufficiently good for including in the regular plant production. The material of marginal quality could be blended with good quality material without affecting the overall quality of the plant production.

The invention has been described with relation to the polymerization of isobutylene with butadiene and isoprene. It will be understood that isobutylene will be the preferred tertiary mono-olefin but that other tertiary mono-olefins may be employed. For example, tertiary monoand diolefin from about 0.3 to 0.9% by weight of the feed mixture. A feed mixture containing approximately 73% diluent, 26.5% of tertiary mono-olefin, and 0.5% of diolefin gives very satisfactory results.

The reactor employed in the practice of the present invention may be charged at a feed rate sufficient to provide an amount of diluent thereto in the range between 8400 and 9600 pounds per hour, an amount of hydrocarbon mixture including tertiary mono-olefin and diolefin in the amounts in the range between 2000 and 3000 pounds per hour and aluminum chloride in the catalytic solution in an amount in the range between 2 pounds and 5 pounds per hour.

The alcohol employed to stop the reaction has been illustrated by isopropyl alcohol. It will be understood, of course, that other alcohols such as propyl alcohols, butyl alcohols, and the like may be used in lieu of isopropyl alcohol. In general, it will be desired to employ alcohols having 2 to 5 carbon atoms in the molecule, such as ethyl alcohol, propyl alcohols, butyl alcohols, and amyl alcohols.

The nature and objects of the present invention having been duly described and illustrated, what I wish to claim as new and useful and to secure by Letters Patent is:

1. A method for terminating the reaction between a tertiary mono-olefin and a diolefin in a reaction zone in which the tertiary mono-olefin and diolefin are being polymerized in a diluent for the reaction at a temperature no greater than $-100°$ F. in the presence of a solution of a Friedel-Crafts catalyst which consists of the steps of separately flowing said catalyst solution and said hydrocarbons in said diluent to said reaction zone, maintaining the temperature in said reaction zone in the range between $-100°$ and $-175°$ F., terminating the flow of catalyst solution to said reaction zone in which said tertiary mono-olefin and a diolefin are being polymerized in said diluent for the reaction, continuing the flow of said hydrocarbons in said diluent for the reaction to said reaction zone, adding to the chilled hydrocarbons and diluent in the reaction zone an amount of a saturated aliphatic alcohol having no more than 5 carbon atoms in the molecule in the ratio of at least 2 mols of alcohol per mol of Friedel-Crafts catalyst in said reaction zone, and recovering the contents of the reaction zone by continuing to supply hydrocarbons and diluent thereto at a temperature in the range between $-100°$ and $-175°$ F. for a substantial length of time sufficient to displace at least ¼ of the contents of the reaction zone.

2. A method for terminating the reaction between a tertiary mono-olefin and a diolefin in a reaction zone in which the tertiary mono-olefin and diolefin are being polymerized in a diluent for the reaction at a temperature no greater than $-100°$ F. in the presence of a solution of a Friedel-Crafts catalyst under conditions of violent agitation, which consists of the steps of separately flowing said catalyst solution and said hydrocarbons in said diluent to said reaction zone, maintaining the temperature in said reaction zone in the range between $-100°$ and $-175°$ F., terminating the flow of catalyst solution to said reaction zone in which said tertiary mono-olefin and a diolefin are being polymerized in a diluent for the reaction, continuing the flow of said hydrocarbons in said diluent for the reaction to said reaction zone while continuing agitation of the mixture of hydrocarbons and diluent in the reaction zone, adding to the chilled hydrocarbons and diluent in the reaction zone an amount of a saturated aliphatic alcohol having no more than 5 carbon atoms in the molecule in the ratio of at least 2 mols of alcohol per mol of Friedel-Crafts catalyst in said reaction zone, and recovering the contents of the reaction zone by continuing to supply hydrocarbon and diluent thereto at a temperature in the range between $-100°$ and $-175°$ F. for a substantial length of time sufficient to displace at least ¼ of the contents of the reaction zone.

3. A method for terminating the reaction between a tertiary mono-olefin and a diolefin in a reaction zone in which the tertiary mono-olefin and diolefin are being polymerized in a diluent for the reaction at a temperature no greater than $-100°$ F. in the presence of a solution of a Friedel-Crafts catalyst under conditions of violent agitation which consists of the steps of separately flowing said catalyst solution and said hydrocarbons in said diluent to said reaction zone, maintaining the temperature in said reaction zone at a temperature in the range between $-100°$ and $-175°$ F., terminating the flow of catalyst solution to said reaction zone in which said tertiary mono-olefin and a diolefin are being polymerized in a diluent for the reaction, continuing the flow of said hydrocarbons in said diluent for the reaction to said reaction zone while continuing the agitation in the reaction zone, adding to the chilled hydrocarbons and diluent in the reaction zone an amount of a saturated aliphatic alcohol having no more than 5 carbon atoms in the molecule in the ratio of 2 mols of alcohol per mol of Friedel-Crafts catalyst in said reaction zone, discontinuing agitation in the reaction zone, and recovering the contents of the reaction zone by continuing to supply hydrocarbons and diluent thereto at a temperature in the range between $-100°$ and $-175°$ F. for a time sufficient to displace at least ¼ of the contents of the reaction zone.

4. A method for recovering a high molecular weight polymer from a reaction zone in which a mixture, including an amount of isobutylene in the range between 20% and 30% by weight, isoprene in an amount in the range between 0.3% and 0.9% by weight, and methyl chloride in an amount in the range between 70% and 80% by weight, is being polymerized at a temperature in the range between $-120°$ and $-145°$ F. in presence of a solution of aluminum chloride in methyl chloride under conditions of violent agitation which consists of separately flowing said aluminum chloride solution and said hydrocarbons in said methyl chloride to said reaction zone, terminating the flow of aluminum chloride solution to said reaction zone in which said mixture is being polymerized, continuing the flow of said feed mixture to the reaction zone while continuing agitation of the contents thereof, adding to the mixture in the reaction zone an amount of isopropyl alcohol sufficient to provide 2 mols of isopropyl alcohol per mol of aluminum chloride in the reaction zone, continuing agitation of the contents of said reaction zone, and recovering the contents of said reaction zone by continuing to supply feed mixture thereto at a temperature in the range between $-120°$ and $-145°$ F. for a substantial length of time sufficient to displace at least ¼ of the contents thereof.

5. A method for recovering a high molecular weight polymer from a reaction zone in which a mixture, including an amount of isobutylene in the range between 20% and 30% by weight, isoprene in an amount in the range between 0.3% and 0.5% by weight, and methyl chloride in an amount in the range between 70% and 80% by weight, is being polymerized at a temperature in the range between $-120°$ and $-145°$ F. in the presence of a solution of aluminum chloride in methyl chloride under conditions of violent agitation which consists of separately flowing said aluminum chloride solution and said hydrocarbons in said methyl chloride to said reaction zone, terminating the flow of aluminum chloride solution to said reaction zone in which said mixture is being polymerized, continuing the flow of said feed mixture to the reaction zone while continuing agitation of the contents thereof, adding to the mixture in the reaction zone an amount of isopropyl alcohol sufficient to provide 2 mols of isopropyl alcohol per mol of aluminum chloride in the reaction zone, discontinuing agitation of the contents of said reaction zone, and recovering the contents of said reaction zone by continuing to supply feed mixture thereto at a temperature in the range between —120° and —145° F. for a substantial length of time sufficient to displace at least ¼ of the contents thereof.

6. A method for recovering a high molecular weight polymer from a reaction zone in which a mixture, including an amount of isobutylene in the range between 20% and 30% by weight, isoprene in an amount in the range between 0.3% and 0.9% by weight, and methyl chloride in an amount in the range between 70% and 80% by weight, is being polymerized at a temperature in the range between —120° and —145° F. in the presence of a solution of aluminum chloride in methyl chloride under conditions of violent agitation which consists of separately flowing said aluminum chloride solution and said hydrocarbons in said methyl chloride to said reaction zone, terminating the flow of aluminum chloride solution to said reaction zone in which said mixture is being polymerized, continuing the flow of said feed mixture to the reaction zone while continuing agitation of the contents thereof, adding to the mixture in the reaction zone an amount of isopropyl alcohol sufficient to provide 2 mols of isopropyl alcohol per mol of aluminum chloride in the reaction zone until ¼ to 1 displacement of the feed admixture in the reaction zone has been effected, discontinuing agitation in said reaction zone for a time sufficient to allow the contents of said reaction zone to coalesce in a suspension of fine particles of solids in said hydrocarbons and methyl chloride, continuing the flow of said feed mixture to said reaction zone at a temperature in the range between —120° and —145° F. until ¼ to 2 displacements of the mixture has been made, and recovering the contents of said reaction zone.

HENRY G. SCHUTZE.

REFERENCES CITED

The following references are of record in the file of this patent:

UNITED STATES PATENTS

| Number | Name | Date |
| --- | --- | --- |
| 2,408,007 | Thomas et al. | Sept. 24, 1946 |
| 2,433,025 | Calfee et al. | Dec. 23, 1947 |
| 2,455,665 | Ford et al. | Dec. 7, 1948 |
| 2,474,571 | Brakeley et al. | June 28, 1949 |